DUO-BINARY FREQUENCY MODULATORS

Filed Nov. 21, 1966 6 Sheets-Sheet 1

June 23, 1970 R. B. HERMAN ET AL 3,517,338

DUO-BINARY FREQUENCY MODULATORS

Filed Nov. 21, 1966 6 Sheets-Sheet 3

June 23, 1970 R. B. HERMAN ET AL 3,517,338

DUO-BINARY FREQUENCY MODULATORS

Filed Nov. 21, 1966 6 Sheets-Sheet 6

United States Patent Office 3,517,338

Patented June 23, 1970

3,517,338

DUO-BINARY FREQUENCY MODULATORS

Ralph Bertrand Herman, William Renwick, and Leonard Charles Walters, Ilford, England, assignors to The Plessey Company Limited, Ilford, Essex, England, a British company Filed Nov. 21, 1966, Ser. No. 617,443
Claims priority, application Great Britain, Nov. 23, 1965, 49,825/65
Int. Cl. H03c *3/40;* H04l *27/10*
U.S. Cl. 332—11 1 Claim

ABSTRACT OF THE DISCLOSURE

A duo-binary frequency modulator for affording a modulated signal of reduced bandwidth using the technique of quadrature modulation.

This invention relates to modulation systems and more specifically to circuit arrangements for generating modulated signals and circuit arrangements for demodulating such such signals.

Any signal waveform may be represented by the time function $$S(t)=A \sin [(\omega_0+\omega_1)t+\varphi] \quad (1)$$

where A is the signal amplitude $\omega_0+\omega_1$ is the signal angular frequency in which $\omega_0$ is a fixed reference angular frequency and $\omega_1$ is a positive or negative deviation of angular frequency with respect to $\omega_0$.

$\varphi$ is the signal phase.

If A and $\varphi$ are constant and $\omega_1$ is zero then Equation 1 represents an unmodulated signal at the angular frequency $\omega_0$; such a signal may be termed a carrier signal and $\omega_0$ may be termed the carrier angular frequency. In order to convey intelligence one or more of the parameters A, $\omega_1$ and $\varphi$ must be varied in a manner which depends on a message waveform M(*t*). This is most commonly performed by means of circuits in which the parameter to be varied is directly controlled by an applied voltage or current related to the message waveform. In a basic modulation system only one parameter is varied. A is varied for amplitude modulation, $\omega_1$ for frequency modulation and $\varphi$ for phase modulation. Frequency modulation and phase modulation are, however, not essentially distinct since any change in $\omega_1$ has the same effect on S(*t*) as an equal change in the time derivative of $\varphi$. Frequency modulation and phase modulation may therefore be regarded as alternative forms of angle modulation.

Other modulation systems are possible in which two or all three of the parameters A, $\omega_1$ and $\varphi$ are simultaneously varied, some of which may be advantageous in certain applications. If there are no restrictions on the manner in which A, $\omega_1$ and $\varphi$ are are varied, then any time varying function may be produced in this way.

Now the function S(*t*) as given by Equation 1 may alternatively be expressed as the sum of in-phase and quadrature-phase components with respect to a signal at the carrier frequency $\omega_0$, i.e.:

$$S(t)=A_1 \sin \omega_0 t+A_2 \cos \omega_0 t \quad (2)$$

where $A_1=A \cos (\omega_1 t+\varphi)$ and $A_2=A \sin (\omega_1 t+\varphi)$ giving $A=\sqrt{A_1^2+A_2^2}$ and $\omega_1 t+\varphi=\tan^{-1} \frac{A_2}{A_1}$ Consequently, a modulated waveform may also be produced by varying either or both of the parameters $A_1$ and $A_2$ in the manner or manners which depend on the message waveform M(*t*) and on the type of modulation required. If there are no restrictions on the signs of $A_1$ and $A_2$ or on the manner in which they may be varied, then as in the previous case, any time varying function may be produced.

In order to demodulate a modulated signal it is necessary to extract the intelligence, i.e., to reconstruct the message waveform M(*t*). This is most commonly performed via the action of devices or circuits which detect the signal amplitude A and/or the angular frequency deviation $\omega_1$ and/or the phase $\varphi$ depending upon the type of modulation which is present and in correspondence with the signal representation of Equation 1. However, the intelligence may also be extracted via the action of devices or circuits which detect the values of the parameters $A_1$ and $A_2$ in correspondence with the signal representation of Equation 2.

The present invention relates specifically to modulation and demodulation systems based on the signal representation of Equation 2, and to associated circuit arrangements. The parameters $A_1$ and $A_2$ in Equation 2 may be described respectively, as the algebraic magnitudes of the in-phase and quadrature phase components of the signal waveform. In the case of a modulated signal, one or both of these parameters must depend on the message waveform. They will therefore be referred to hereinafter as the "message function components," $A_1$ being the "in-phase message function component" and $A_2$ the "quadrature phase message function component." A circuit or device for generating the message function components pertaining to any particular modulation system when supplied with a message waveform M(*t*), will hereinafter be termed a "message function component generator." A circuit or device for reconstructing the message waveform M(*t*) when supplied with the message function components will hereinafter be referred to as an "inverse function generator."

According to one aspect of the invention there is provided a quadrature modulator comprising a message function component generator to which is applied a message waveform and which generates two message function components, multiplying means for multiplying the two message function components, respectively, by a different one of two carrier signals which are in phase quadrature to one another, and adding means for adding the products signals from the multiplying means so as to produce a modulated signal. It is a feature of this first aspect of the invention that, by appropriate design of the message function component generator, any required type of modulated signal may thus be generated.

In carrying out the invention according to the first aspect thereof the quadrature modulator may be constructed and arranged to produce a frequency shift keyed signal (F.S.K.) when the message waveform M(*t*) is a digital waveform which takes only the value $\pm 1$. For this purpose the message function component generator comprises a source of alternating voltage having two outputs one of which provides one of said two message function components, phase shifting means connected to the second of said two outputs for shifting the phase of the alternating voltage through an angle of $\pi/2$ radians, and multiplying the output from said phase shifting means by the said message function so as to produce a product signal corresponding to the second of the said two message function components.

Alternatively, the invention may provide a quadrature modulator for producing what may be called "minimum bandwidth complementary-channel amplitude modulation" when the message M(t) is a digital waveform as described above. In this example the message function component generator comprises generating means for generating a square wave having a period equal to twice the digit period of the message waveform, first filter means for filtering the square wave so as to produce a sinusoidal waveform corresponding to one of said two message function components, multiplying means for multiplying the square wave by the said message waveform, and second filter means for filtering the output from the multiplying means so as to produce the second of said two message function components.

Still further, the invention may provide a quadrature modulator for producing duo binary frequency modulation when the message is in digital form. In this example the message function component generator comprises two "AND" gates, an input terminal of each gate having the said message waveform applied to it, generating means for generating two interlaced pulse trains each having a pulse repetition period equal to twice the digit period of the message waveform, the pulse trains being applied respectively to a second input terminal of each two "AND" gates, two binary counters, the input terminals of which are connected respectively to the output terminals of the said two gates, and filter means for filtering the output waveforms from each of the said two binary counters so as to produce the said two message function components.

According to a second aspect of the invention there is provided a quadrature demodulator comprising multiplying means for multiplying a received modulated signal by a first referencce signal at a carrier frequency and also by a second reference signal at the same carrier frequency but which is in phase quadrature to the first, filter means for filtering the outputs from the multiplying means so as to obtain the two message function components, and an inverse function generator to which the said two message function components are applied and from which is obtained a signal corresponding to the original message waveform. It is a feature of this second aspect of the invention that, by appropriate design of the inverse function generator any given type of modulated signal may thus be demodulated.

The invention according to the aforesaid second aspect may provide a quadrature demodulator for demodulating a modulated signal when the modulation system is "minimum bandwidth complmentary-channel amplitude modulation." In this example the inverse function generator comprises squaring means for squaring one of said two message function components so as to produce a square wave having a period equal to twice the digit period, sampling means for sampling the second of said two message function components at time instants corresponding to transitions in the square wave, a bistable circuit so arranged and connected that its state at any instant is determined by the sign of the previous sample of the second of said two message function components, and multiplying means for multiplying the square wave by the output from the said bistable circuit so as to produce a product signal corresponding to the original message waveform. The reference signals at the carrier frequency may be obtained from a local oscillator the frequency of which is voltage controllable and which comprises multiplying means for multiplying the said two message function components together, and filter means for filtering the output of said multiplying means to obtain a product signal which is used to control said local oscillator.

A quadrature demodulator according to the invention may also serve for demodulating a signal which is frequency modulated by any type of message waveform. In this example the inverse function generator comprises two differentiating circuits which differentiate respectively the two message function components, two multipliers, the first multiplier being connected to multiply one of said two message function components by the differential of the second of the said two message function components, and the second multiplier being connected so as to multiply the second of said two message function components by the differential of the first of said two message function components, and a subtracting circuit arranged to subtract the products of the two multipliers so as to produce a difference signal corresponding to the said message waveform. In this application the phase of the reference signal at the carrier frequency is unimportant and this signal may therefore be derived from a free-running local oscillator.

The foregoing and other features of the invention will be evident from some exemplary embodiments of the invention which will now be described with reference to the accompanying drawings in which.

Conventional circuit elements for performing various functions, as will hereinafter be apparent, are for convenience represented as blocks in the accompanying diagrams.

Figure 1:
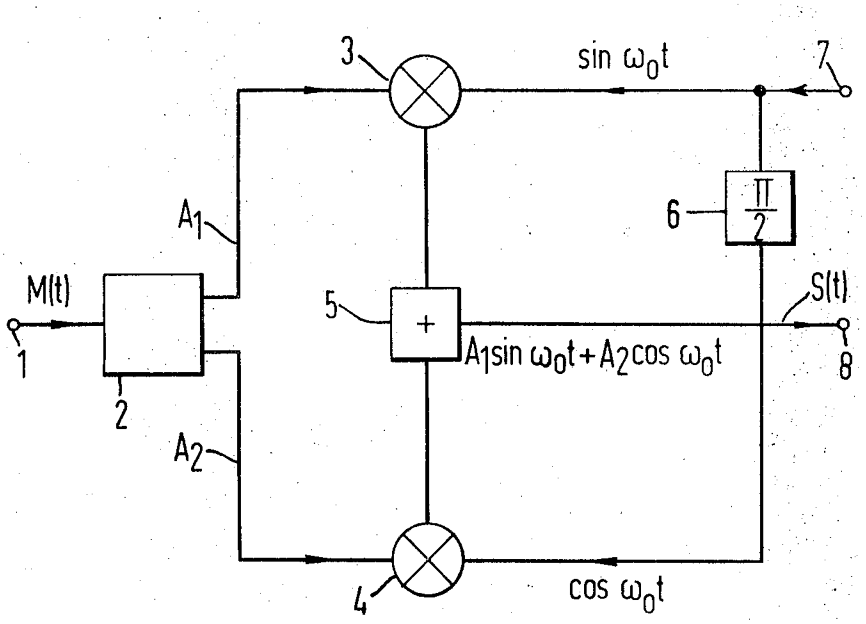
FIG. 1 shows a block schematic diagram of a generalized quadrature modulator.

Referring to FIG. 1, the quadrature modulator consists of an input terminal 1, to which is applied a message waveform M($t$) and this is connected to a message function component generator 2. The message function component generator provides two outputs $A_1$ and $A_2$ which are related to the modulating signal in a manner dependent upon the type of modulation used. The outputs $A_1$ and $A_2$ which have heretofore been referred to as the message function components are applied to multipliers 3 and 4, respectively. A carrier waveform for example sin $\omega_0 t$ is applied to the modulator at terminal 7 and this provides a second input to multiplier 3. This carrier waveform is shifted in phase through an angle $\pi/2$ radians by means of phase shifters 6 to give a second carrier waveform cos $\omega_0 t$ at the same frequency but in phase quadrature with the first. The phase shifted carrier waveform provides a second input to multiplier 4. Multiplier 3 and 4 generator output waveforms $A_1$ sin $\omega_0 t$ and $A_2$ cos $\omega_0 t$ respectively, and both these waveforms are connected to adder 5. The output from adder 5 consists of the required modulated waveform which can be designated S($t$), where $$S(t)=A_1 \sin \omega_0 t+A_2 \cos \omega_0 t$$

and this is joined to the output terminal 8. The message function component generator 2 may have a wide variety of forms depending upon the particular type of modulation which it is required to produce.

In the case of modulation systems in which only the amplitude of the signal is to be varied, the generalised quadrature modulator reduces to a form which does not differ essentially from a conventional amplitude modulator. This is because the message function component generator need only provide one output waveform in this case. However, in the case of angle modulation systems, or systems in which the angle and amplitude of the signal are both varied, the quadrature modulator may have important advantages compared with other means of achieving a similar end result. This will depend on the particular details of the system being considered.

Figure 2:
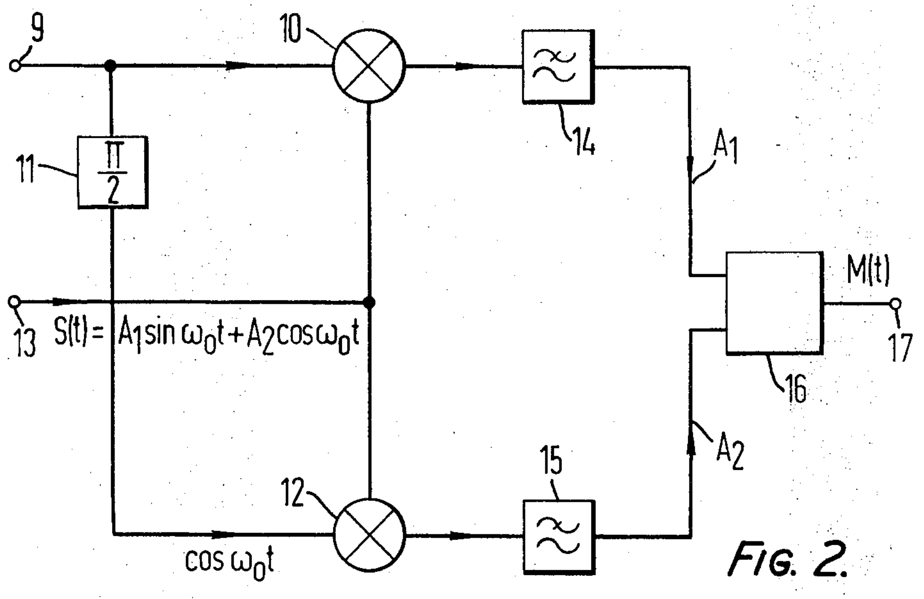
FIG. 2 shows a block schematic diagram of a generalized quadrature demodulator.

FIG. 2 shows a block schematic diagram of generalised quadrature demodulator which can be used to demodulate the output signal from a generalised quadrature modulator. It is assumed in general that a reference carrier signal corresponding to the carrier input to the quadrature modulator is available at the receiving terminal. This may be obtained in any one of several possible ways. For example, a local oscillator may be provided at the receiving terminal, the frequency and phase of this oscillator being controlled by the received modulated signal in such a manner that it is locked to the required frequency and phase. Alternatively, a pilot signal could be transmitted at the carrier frequency or at a frequency bearing a known relation to the carrier frequency such pilot signal being used to derive the reference signal or to control a local oscillator. If a local oscillator with adequate frequency stability is employed the control information need not be continuous and a pilot carrier could be transmitted in the form of short pulses arranged to coincide with interruptions in the message waveform. In the case of certain particular types of the quadrature demodulator the phase of the reference carrier signal is unimportant and a local oscillator without frequency or phase control may then suffice.

The reference carrier signal sin $\omega_0 t$, is applied to terminal 9 which is connected to one input multiplier 10. This carrier signal is also connected to phase shifter 11 which produces a phase shift of $\pi/2$ radians so as to give an output waveform cos $\omega_0 t$. This provides one input to multiplier 12. A modulated signal input $S(t)$ where $S(t)$ can be expressed in the form $$S(t)=A_1 \sin \omega_0 t+A_2 \cos \omega_0 t$$

is applied to terminal 13 and provides the second input to multipliers 10 and 12. The output from multiplier 10 therefore contains components in the vicinity of twice the carrier frequency, as well as the message function component $A_1$ which is assumed to be of lower frequency. The output from multiplier 10 is connected to low pass filter 14 which removes the high frequency components and produces an output waveform which is the message function component $A_1$. Similarly, the output from multiplier 12 is passed through filter 15 to give an output waveform which is the message function component $A_2$. The outputs from filters 14 and 15 are connected to separate inputs of an inverse function generator 16. This is designed so as to perform the inverse operation to that of the message function component generator in the quadrature modulator of FIG. 1. The output 17 from the inverse function generator is therefore the required message waveform $M(t)$.

In the case of modulation systems in which only the amplitude of the signal is varied the quadrature demodulater reduces to a form which does not differ essentially from conventional synchronous detecting systems. However, the generalised quadrature demodulator is also applicable to modulation systems in which the signal frequency or phase is varied either alone or as well as the signal amplitude. Synchronous detection of such signals would often be difficult or impracticable to realise with previously known types of demodulator.

Figure 3:
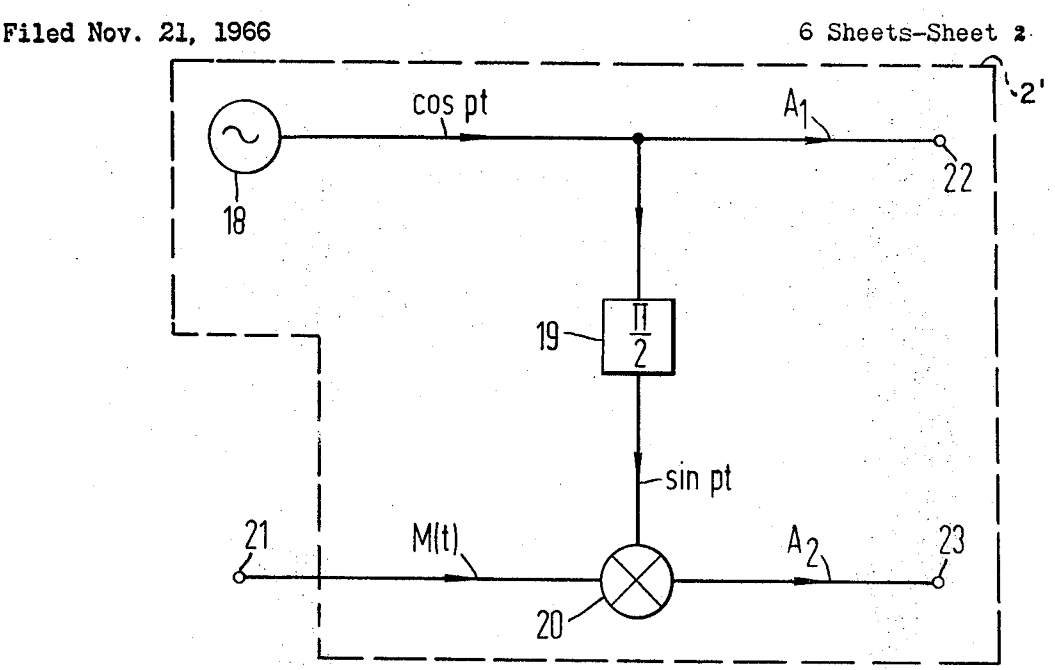
FIG. 3 is shows a block schematic diagram of a message function component generator for use in a quadrature modulator for producing a frequency shift-keyed signal.

FIG. 3 shows a block schematic diagram of a modified message function component generator 2′ for use in a quadrature modulator which is required to generate a frequency shift keyed signal when the message to be transmitted is a binary digital waveform having the levels +1 and −1, and the desired deviation in the angular frequency of the modulated signal is $\pm p$ with respect to the unmodulated carrier angular frequency $\omega_0$. The desired modulated signal waveform may then be represented by the equations $$S(t)=\sin(\omega_0 t+pt) \text{ for } M(t)=+1 \quad (3)$$
$$S(t)=\sin(\omega_0 t-pt) \text{ for } M(t)=-1 \quad (4)$$

Now we have $$S(t)=A_1 \sin \omega_0 t+A_2 \cos \omega_0 t \quad (2)$$

Combining each of Equations 3 and 4 with Equation 2 gives $$A_1=\cos pt;\ A_2=\sin pt \text{ for } M(t)=+1 \quad (5)$$
$$A_1=\cos pt;\ A_2=-\sin pt \text{ for } M(t)=-1 \quad (6)$$

A message function generator to produce the message function components $A_1$ and $A_2$ as given by Equations 5 and 6 may be constructed in the manner shown in FIG. 3. In this figure, an oscillator 18 generates a waveform cos $pt$ which directly provides the output $A_1$ via output terminal 22. The oscillator is also connected to a phase shifter 19 so as to produce an output waveform sin $pt$. This waveform is connected to a multiplier 20 which has a second input consisting of the message waveform $M(t)$. The output from the multiplier 20 is therefore $M(t)$ sin $pt$, corresponding to the message function component $A_2$.

In the case considered, the advantages of the quadrature modulator compared with direct variation of the frequency of the carrier source by the message waveform include the following. Firstly, the carrier frequency may be derived from a highly stable frequency source and its frequency stability is in no way degraded by the modulation process. Secondly, the deviation frequency may likewise be defined by another high stable frequency source and it may, if desired, be accurately related in frequency and phase to the digit frequency. Thirdly, if it is desired to band limit the modulated output signal, this may readily be achieved by band limiting the waveform $A_2$ with a low pass filter. If such a filter cuts off at an angular frequency $\omega_c$ then the bandwidth of the modulated output signal is thereby restricted to an angular frequency $2\omega_c$, provided $\omega_c$ is not less than $p$. By contrast, if direct frequency modulation of the carrier source were employed, then to achieve equivalent bandwidth limitation it would be necessary to pass the output waveform through a bandpass filter of angular bandwidth $2\omega_c$ and centre frequency $\omega_0$. The bandpass filter would be more difficult to construct than the corresponding low pass filter and design of such a filter might not be feasible if $\omega_0$ were very large compared with $\omega_c$. Also the bandpass filter would have to be tuneable if it were required that the carrier frequency of the modulator should be variable.

Figure 4:
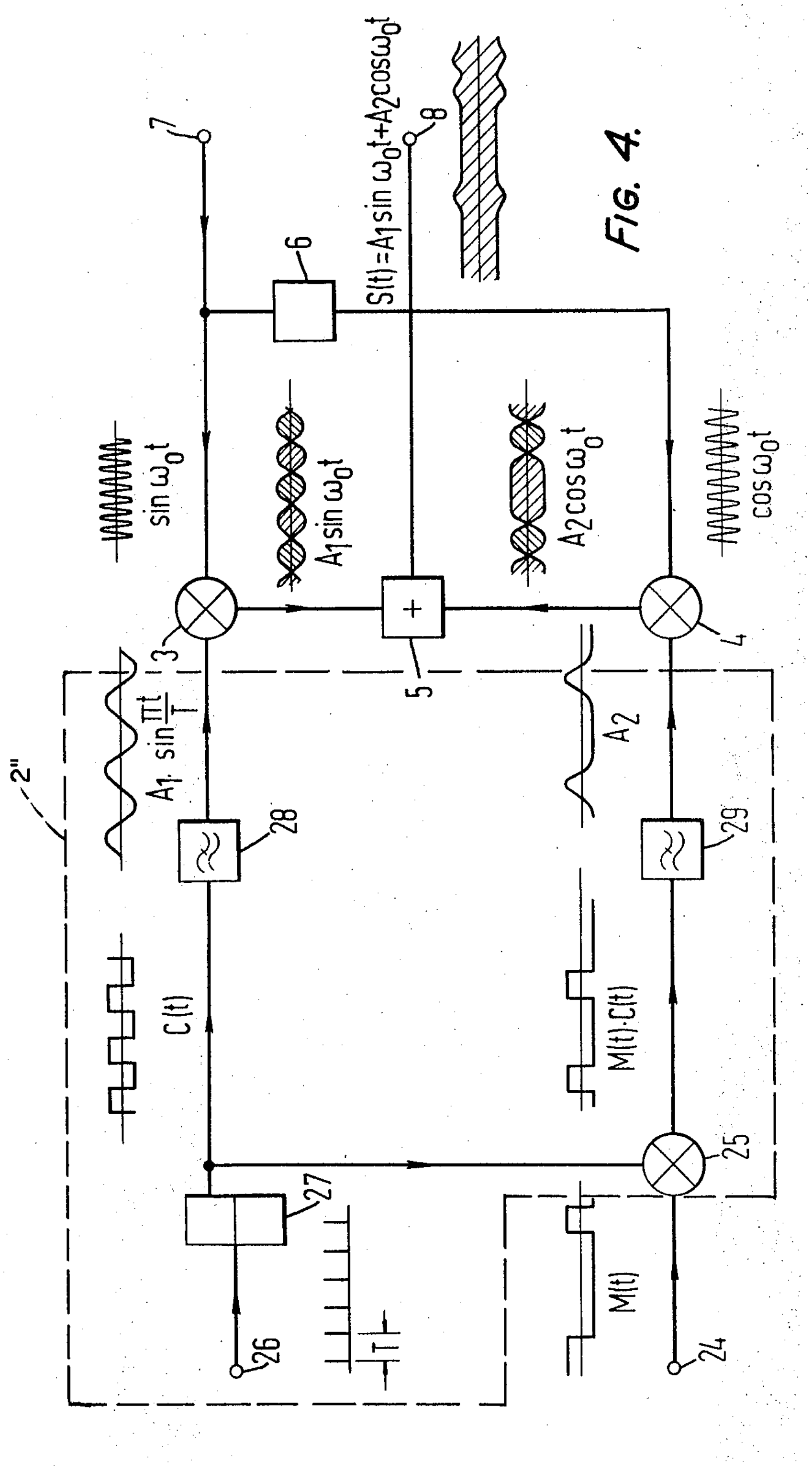
FIG. 4 shows a block schematic diagram of a quadrature modulator suitable for generating a "minimum bandwidth complementary-channel amplitude modulation" signal together with typical waveforms.
Figure 6:
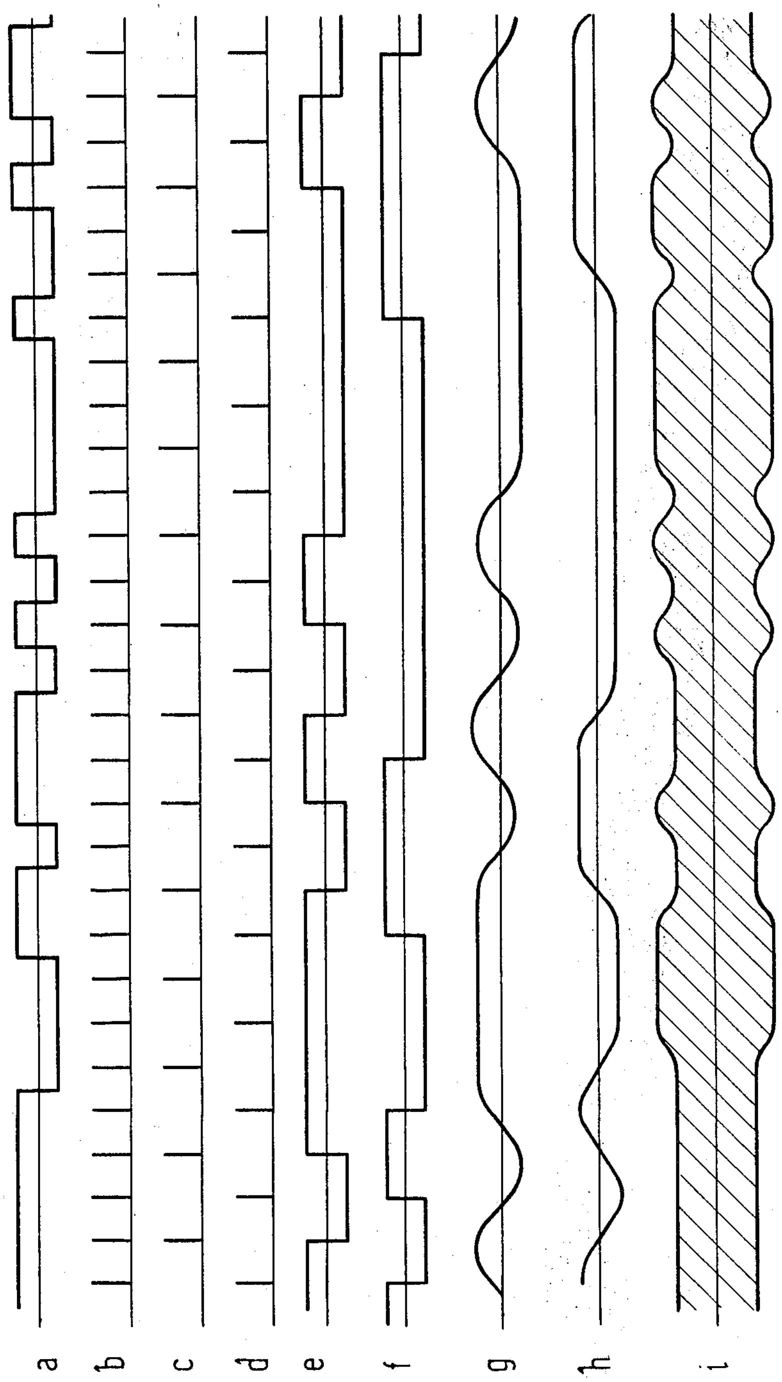
FIG. 6 shows typical waveforms existing in the quadrature modulator of FIG. 5.

FIG. 4 shows a block schematic diagram of a quadrature modulator including another form of message function component generator 2″ which is for use with binary digital message waveforms and which generates a signal that is considered to represent a new form of modulation system. This modulation system has been called "minimum bandwidth complementary-channel amplitude modulation" (M.B.C.A.M.) as it was conceived, in the first instance, as a combination of two amplitude modulated signals of minimum theoretical bandwidth which are at separated carrier frequencies and in which the two modulating waveforms are complementary forms of the same message. It therefore has similarities to conventional frequency modulation, but it has the important advantage that it can be contained in a narrower bandwidth than is usually considered practicable for digital frequency modulation. It is assumed that the message waveform, $M(t)$, is divisible into equal digit periods, T, each of which will be denoted as either a mark (for $M(t)$ positive) or a space (for $M(t)$ negative). The required signal waveform for M.B.C.A.M. may then be represented by the equations $$S(t)=-\cos\left(\omega_0 t+\frac{\pi t}{T}\right) \qquad (7)$$

for a mark digit preceded by a mark $$S(t)=\cos\left(\omega_0 t-\frac{\pi t}{T}\right) \qquad (8)$$

for a space digit preceded by a space $$S(t)=\sin\frac{\pi t}{T}\sin\omega_0 t\pm\cos\omega_0 t \qquad (9)$$

for a digit corresponding to a transition from a mark to a space or from a space to a mark.

Combining these equations with Equation 2 gives $$A_1=-\sin\frac{\pi t}{T};\ A_2=-\cos\frac{\pi t}{T} \qquad (10)$$

for a mark digit preceded by a mark $$A_1=\sin\frac{\pi t}{T};\ A_2=\cos\frac{\pi t}{T} \qquad (11)$$

for a space digit preceded by a space $$A_1=\sin\frac{\pi t}{T};\ A_2=\pm 1 \qquad (12)$$

for a transition.

The rule for selecting the sign of $A_2$ in Equation 12 is that there should be no discontinuities between digit periods in the value of $A_2$.

The circuit diagram of a quadrature modulator to generate the M.B.C.A.M. signal is shown in FIG. 4, which also indicates typical waveforms. The message waveform $M(t)$ is applied to terminal 24 which is connected to a multiplier 25. It is assumed that a source of pulses at the digit frequency of the message is available, and this is connected to the circuit at terminal 26. The digit pulses operate a binary counter 27 so as to produce at the output of the counter a clock wave, $C(t)$, which has the form of a rectangular wave, the period of which is twice the digit period. The clock wave is connected to a low pass (or bandpass) filter 28 the cut-off frequency of which is such as to pass only the fundamental component of the clock wave. The output from filter 28 is therefore a sinusoidal waveform at half the digit frequency and corresponds to the required message function component, $$A_1=\sin\frac{\pi t}{T}$$

The clock wave is also connected to the multiplier 25 which produces an output waveform $M(t).C(t)$. The waceform $M(t).C(t)$ is connected to a low pass filter 29, the characteristics of which are chosen to be such that each transition in the input waveform is approximately shaped to a half-cycle of a cosine waveform at half the digit frequency. The output waveform from filter 29 corresponds to the message function component $A_2$ as given by Equations 10, 11 and 12. The rest of the circuit is similar to the corresponding part of the generalised quadrature modulator shown in FIG. 1, and previously described.

The M.B.C.A.M. waveform may be detected by a conventional F.M. detector such as a frequency discriminator. It may also be synchronously detected by a form of the quadrature demodulator.

Figure 5:
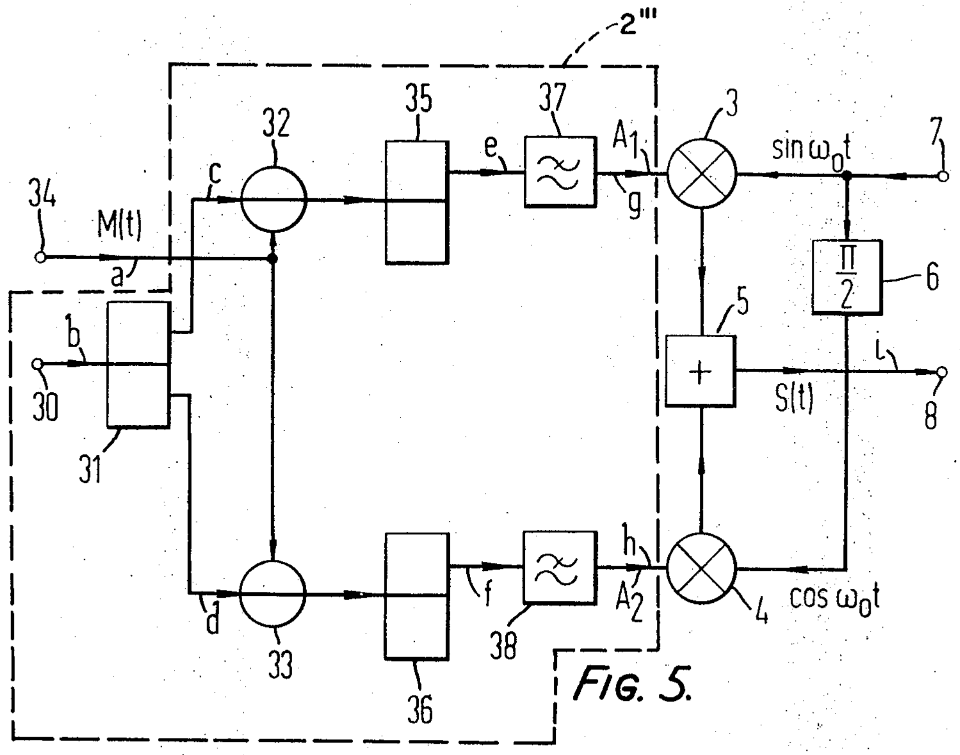
FIG. 5 shows a block schematic diagram of quadrature modulator suitable for generating a duobinary frequency modulated signal.

FIG. 5 shows a block schematic diagram of a particular form of the generalised quadrature modulator including another form of message function component generator 2''' which produces an output waveform similar to that of duobinary frequency modulation. This is a form of modulation described in an article, "The Duobinary Technique for High Speed Data Transmission," by A. Lender in I.E.E. Transactions, Communications and Electronics, No. 66, pp. 214–218, and which enables the signal bandwidth to be halved for a given digit transmission rate. The frequency of the modulated signal is equal to the carrier frequency for a message space but is displaced by plus or minus a quarter of the digit frequency for a message mark. As described in the reference, the modulated signal is generated by transforming the message waveform into differential binary form, applying this waveform to switch the frequency of an oscillator and then passing the oscillator output waveform through a bandpass filter. This filter requires to have an accurately defined characteristic for satisfactory operation. According to the present invention a similar waveform may be produced, without the need for any bandpass filter, by means of the circuit shown in FIG. 5. Typical waveforms at various points in FIG. 5 as indicated by the letters *a* to *i* are shown in FIGS. 6*a* to *i*. The operation of FIG. 5 is as follows.

A source of pulses at the digit frequency is connected to terminal 30 and these pulses operate a binary counter 31. This counter provides two output waveforms. The first consists of pulses coincident with the even digit pulses while the second consists of pulses coincident with the odd digit pulses. These waveforms are joined respectively to "AND" gates 32 and 33. The message waveform $M(t)$ is applied to terminal 34 and provides the second input to gates 32 and 33. Gate 32 therefore produces an output pulse whenever an even digit pulse coincides with a mark digit while gate 33 produces an output pulse whenever an odd digit pulse coincides with a mark digit. The output pulses from gates 32 and 33 operate binary counters 35 and 36, respectively. The output waveform from each of these counters is a digital waveform which changes state whenever the counter receives an input pulse. The outputs from counters 35 and 36 are connected to low pass filters 37 and 38, respectively. These filters are similar to each other and the characteristic of each filter are such that each transition in the waveform applied to its input is approximately shaped to a half-cycle of a sine or cosine waveform at a quarter of the message digit frequency. The output waveforms from filters 37 and 38 correspond respectively to the message function components $A_1$ and $A_2$. The rest of the circuit is similar to the corresponding part of FIG. 1.

The waveform $A^1$ and $A_2$ generated in the above manner, satisfy the following equations.

$$A_1=\pm\sin\frac{\pi t}{2T};\ A_2=\pm\cos\frac{\pi t}{2T} \qquad (13)$$

for successive marks $$A_1=\pm 1;\ A_2=\pm 1 \qquad (14)$$

for successive spaces $$\left.\begin{array}{l} A_1=\pm 1;\ A_2=\pm\cos\frac{\pi t}{2T} \\ \text{or} \\ A_1=\pm\sin\frac{\pi t}{2T};\ A_2=\pm 1 \end{array}\right\} \qquad (15)$$

for a message transition.

The output signal $S(t)=A_1\sin\omega_0 t+A_2\cos\omega_0 t$ is thus given by $$S(t)=\pm\cos\left(\omega_0 t\pm\frac{\pi t}{2T}\right) \qquad (16)$$

for successive marks and $$S(t)=\pm\sqrt{2}\cos\left(\omega_0 t\pm\frac{\pi}{4}\right) \qquad (17)$$

for successive spaces.

It will be seen that these frequencies correspond to the required frequencies for a duobinary F.M. system.

The method of detection of duobinary F.M. signal as described in the reference is essentially to use a frequency discriminator followed by a three-level decision circuit. However, a duobinary signal generated in the manner described according to the present invention can also be synchronously detected by means of the quadrature demodulator. It is doubtful whether this would be possible for a duobinary F.M. signal generated in the manner described in the reference, since in this case the frequency deviation is not locked in relation to the digit frequency. Other advantages in the present invention for generating duobinary F.M. are that, because of the elimination of bandpass filters there is no significant restriction on the ratio of the carrier frequency of the modulator to the digit frequency and the carrier frequency may be changed without significant alteration to the circuit.

Figure 7:
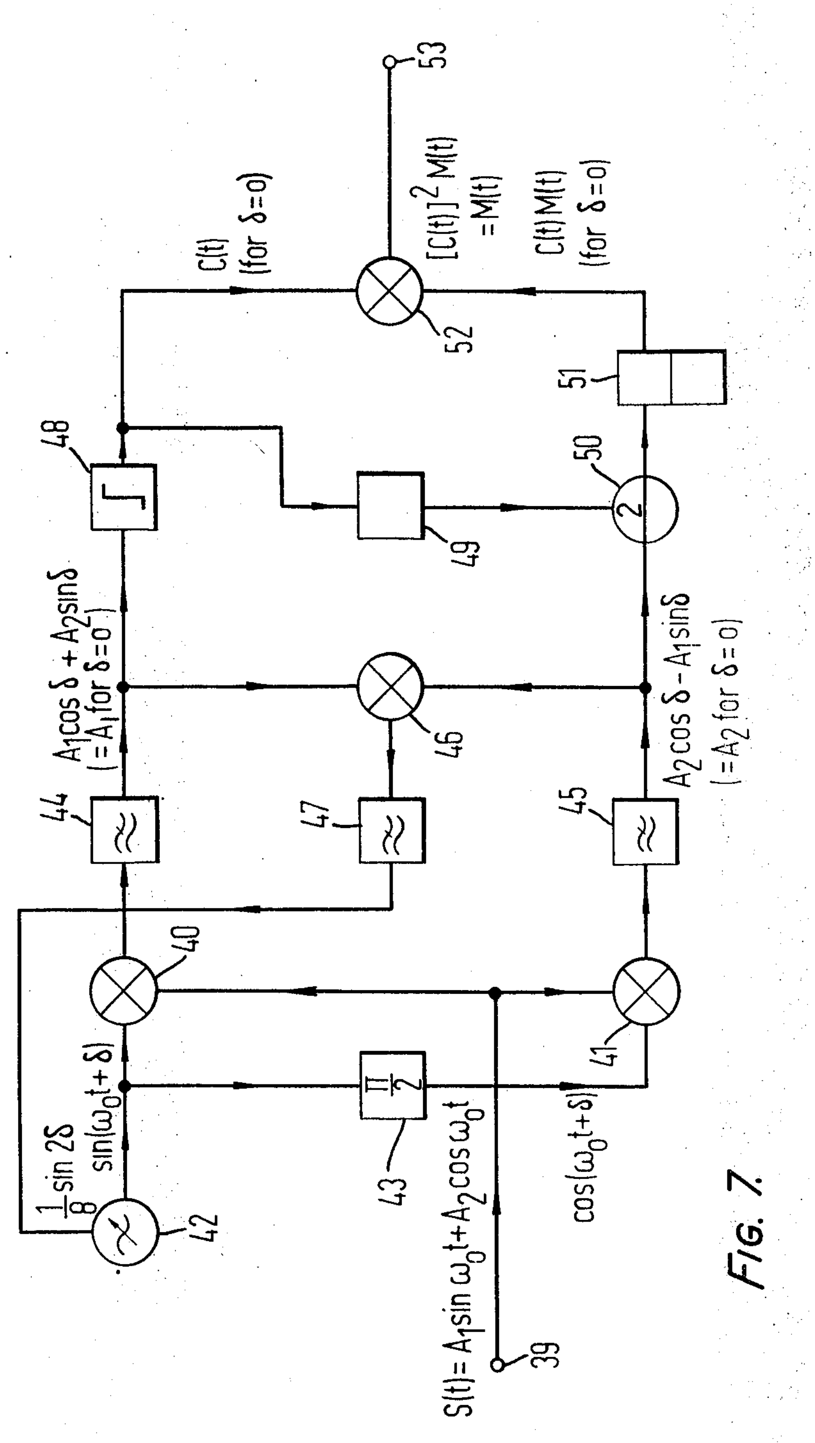
FIG. 7 shows a block schematic diagram of a quadrature demodulator for use with "minimum bandwidth complementary-channel amplitude-modulated" signals.

FIG. 7 is a block schematic diagram of a particular form of quadrature demodulator for the purpose of synchronously detecting an M.B.C.A.M. signal waveform, as might be produced by the circuit of FIG. 4. The operation of the demodulator may be explained by reference to the circuit shown in FIG. 7, which includes provisions for reconstituting the carrier waveform from the received modulated signal. The input signal, $$S(t)=A_1 \sin \omega_0 t+A_2 \cos \omega_0 t$$

(where $A_1$ and $A_2$ are as previously defined for M.B.C.A.M.) is applied to the circuit at terminal 39 which is connected to multipliers 40 and 41. A reference carrier signal is generated by an oscillator 42, the frequency of which may be voltage controlled. For the purpose of the explanation it will be assumed that the phase of the output signal from this oscillator is initially in error by an amount $\delta$ relative to the desired phase, so that the output waveform may be represented by the function sin $$(\omega_0 t+\delta).$$

This waveform provides the second input to multiplier 40. It is also connected to a phase shifter 43 which produces a phase shift of $\pi/2$ radians and gives an output $\cos(\omega_0 t+\delta)$ providing the second input to multiplier 41. The output from multiplier 40 is passed through a low pass filter 44 to give an output waveform.

$$A_1 \cos \delta+A_2 \sin \delta$$

Similarly, the output from multiplier 41 is passed through low pass filter 45 to give a waveform.

$$A_2 \cos \delta-A_1 \sin \delta$$

The output signals from the two low pass filters are connected to separate inputs of a multiplier 46. The output from multiplier 46 is connected to a low pass filter 47 which has a cut-off frequency that is fairly small compared with the digit frequency. It may be shown that for any message waveform other than all marks or all spaces there will be an output from the low pass filter 47 which is related to the phase error in the voltage controlled oscillator 42, and that the *a* unit amplitude message consisting of a random stream of digits the mean value of the output from the filter 47 is ⅛ sin 2$\delta$. The output from filter 47 is connected to the control point of the oscillator 42 by which means the frequency and phase of the oscillator are automatically locked to give $\delta=0$.

The output from low pass filter 44 is additionally connected to a squarer 48 which, for $\delta=0$, gives an output waveform $C(t)$ which is a square wave corresponding to the clock wave in the M.B.C.A.M. modulator. This is connected to a digit sampling pulse generator 49 which produces short pulses at the digit frequency, corresponding to transitions in the clock wave. These are applied to open a sampling gate 50. The other input to the sampling gate 50 is the output from the low pass filter 45 which corresponds, for $\delta=0$ to the message function component $A_2$. The phasing in the system is adjusted to be such that the waveform $A_2$ is sampled at the end of each digit period (i.e., when $A_2$ is at a peak positive or negative value) so as to ensure maximum detection efficiency when noise is present. The output from the sampling gate 50 is connected to a bistable circuit 51 and sets it to one or other of its two states depending on the sign of the waveform $A_2$ during each sampling pulse: The output from bistable 51 is therefore a digital waveform which, in the absence of errors, corresponds to the waveform $C(t)M(t)$ as shown in the M.B.C.A.M. modulator. This is applied to a multiplier 52 which receives, as its second input, the waveform $C(t)$ from the output of squarer 48. The output from multiplier 52 obtained via terminal 53 is therefore the original message waveform $M(t)$ since $$[C(t)]^2=1$$

It will be understood that in practice various circuit refinements may be included to simplify the adjustments or improve the performance which are not shown in FIG. 7. These may include amplifiers, adjustable delay circuits and a locked oscillator at the digit frequency.

Figure 8:
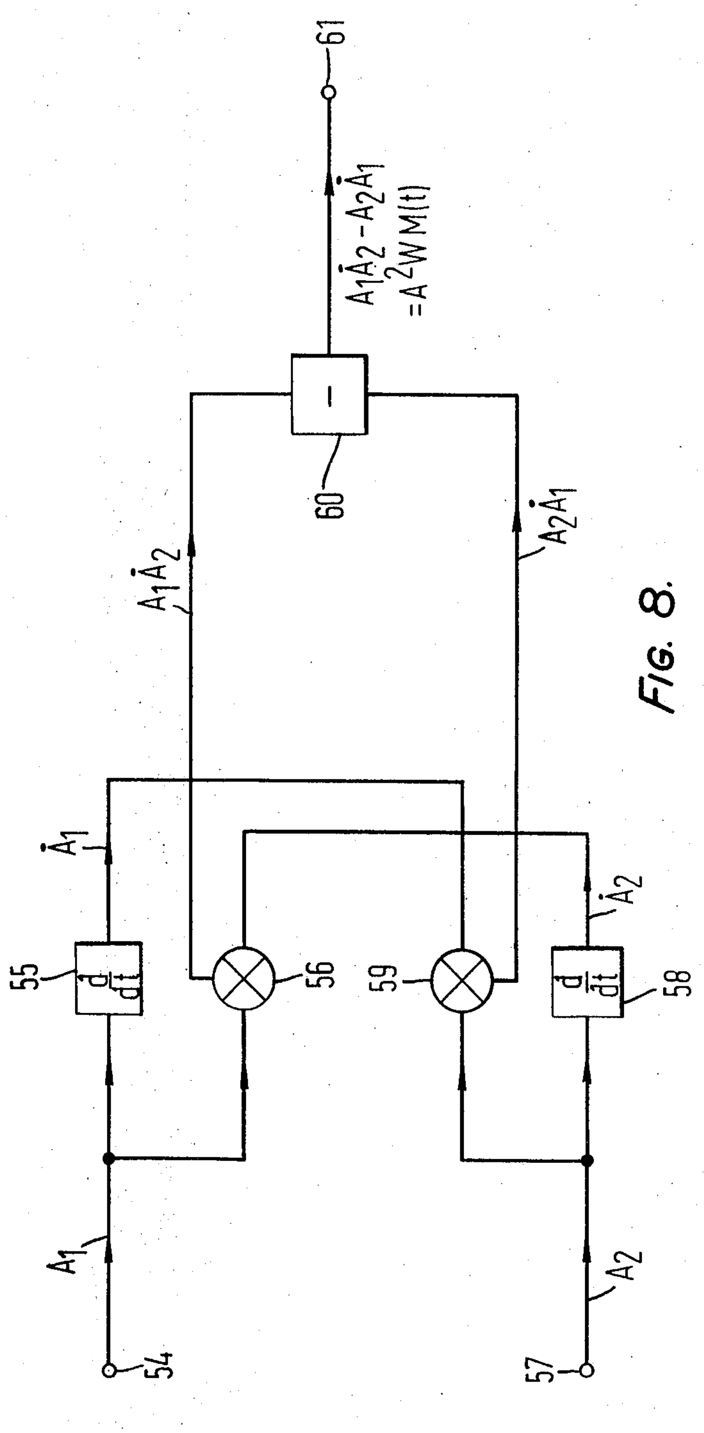
FIG. 8 shows a block schematic figure diagram of an inverse function generator for use in a quadrature demodulator suitable for demodulating a signal which is is frequency modulated by any type of message waveform.

FIG. 8 is a block schematic diagram of an inverse function generator for use in a quadrature demodulator suitable for demodulating a signal which is frequency modulated by any type of message waveform. To understand the operation of this circuit it should first be noted that a carrier signal A sin $\omega_0 t$ which is frequency modulated by any message waveform $M(t)$ may be represented by the time function.

$$S(t)=A \sin[\omega_0 t+W\int M(t)\, dt] \quad (18)$$

where W is a constant angular frequency representing the deviation for $M(t)=1$.

Combining Equation 18 with Equation 2 gives $$A_1=A \cos [W\int M(t)\, dt] \quad (19)$$
$$A_2=A \sin [W\int M(t)\, dt] \quad (20)$$

Let the time derivatives of $A_1$ and $A_2$ be denoted by $\dot{A}_1$ and $\dot{A}_2$ respectively. Then from Equations 19 and 20.

$$\dot{A}_1=-AW\, M(t) \sin [W\int M(t)\, dt] \quad (21)$$
$$\dot{A}_2=AW\, M(t) \cos [W\int M(t)\, dt] \quad (22)$$

Combining Equations 19, 20, 21, and 22 gives $$A_1\dot{A}_2-A_2\dot{A}_1=A_2W\, M(t) \quad (23)$$

Since A and W are both constants, the right-hand side of Equation 23 represents a waveform which is proportional to the original message waveform. Hence if the inverse function generator in the quadrature demodulator is designed so as to process the message function components $A_1$ and $A_2$ in the manner represented by the left-hand side of Equation 23, then the message waveform will be reconstructed.

If FIG. 8, the message function component $A_1$ is applied to terminal 54 which is connected to the input of the differentiating circuit 55 and to one input of a multiplier 56. Similarly, the message function components $A_2$ is applied to terminal 57 which is connected to the input of the differentiating circuit 58 and to one input of multiplier 59. The output from the differentiating circuit 55 provides the second input to the multiplier 59 and the output from the differentiating circuit 58 provides the second input to the multiplier 56. Hence the output from multiplier 56 is the function $A_1\dot{A}_2$ while that from multiplier 59 is the function $A_2\dot{A}_1$. These are connected to separate inputs of the subtracting circuit 60 which produces an output waveform $A_1\dot{A}_2-A_2\dot{A}_1$ which is connected to the output terminal 61. As explained herebefore, this output signal is proportional to the message waveform $M(t)$.

It may easily be shown that if the phase of the reference signal at the carrier frequency which is applied to a quadrature demodulator containing an inverse function generator as just described, is in error by a constant angle $\delta$, then although the waveforms produced at the input terminals of the inverse function generator will be altered, the output waveform from the inverse function generator will not be affected. Moreover, if the frequency of the reference signal is in error by an angular frequency $\Delta\omega$, the only end result is to add a term equal to $A^2\Delta\omega$ to the output from said inverse function generator. This will be unimportant providing $\Delta\omega$ is sufficiently small. Hence the reference signal is a quadrature demodulator for demodulating a frequency modulated signal, and wherein the inverse function generator is as shown in FIG. 8, may be generally obtained from a local oscillator set to generate a frequency at or close to $\omega_0$, and which need not be frequency or phase locked.

In the case just considered, the advantages of the quadrature demodulator, compared with previously known methods of demodulating a signal which is frequency modulated by any message waveform include the following. Firstly, the only filter required are low pass filters which can more readily be constructed than band-pass filters. Secondly, there is no image frequency response, which reduces the probability of interference from other signals. Thirdly, a demodulator according to the present invention may be capable of providing a better output signal to noise ratio when the received modulated signal is perturbed by noise.

What is claimed is:

1. A modulator comprising a message function component generator to which is applied a message waveform having a pre determined digit period and which generates two message function components, multiplying means for multiplying the two message function components respectively by a different one of two carrier signals which are in phase quadrature to one another, and adding means for adding the product signals from the multiplying means so as to produce a modulated signal, wherein the message function component generator comprises two "AND" gates, an input terminal of each gate having the said message waveform applied to it, generating means for generating two interlaced pulse trains each having a pulse repetition period equal to twice the digit period of the message waveform, the pulse trains being applied respectively to a second input terminal of each of said two "AND" gates, two binary counters the input terminals of which are connected respectively to the output terminals of said two gates, and filter means for filtering the output waveform from each of said two binary counters so as to produce the said message function components.

References Cited

UNITED STATES PATENTS

| | | | |
|---|---|---|---|
| 3,229,230 | 1/1966 | Feldman. | |
| 3,243,731 | 3/1966 | Erickson. | |
| 3,320,552 | 5/1967 | Glasser | 332—43 X |

ALFRED L. BRODY, Primary Examiner

U.S. Cl. X.R.

178—66; 325—30, 40, 163; 328—104; 332—23